(12) United States Patent
Maguire et al.

(10) Patent No.: US 7,539,562 B2
(45) Date of Patent: May 26, 2009

(54) HYBRID VEHICLE POWERTRAIN CONTROL METHOD AND APPARATUS

(75) Inventors: Joel M. Maguire, Northville, MI (US); Madhusudan Raghavan, West Bloomfield, MI (US); Robert P. Roesser, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 30 days.

(21) Appl. No.: 11/681,800

(22) Filed: Mar. 5, 2007

(65) Prior Publication Data

US 2007/0208467 A1  Sep. 6, 2007

Related U.S. Application Data

(60) Provisional application No. 60/779,602, filed on Mar. 6, 2006.

(51) Int. Cl.
*G05D 3/00* (2006.01)
(52) U.S. Cl. .................. 701/22; 701/123; 180/65.4; 180/65.8; 903/921
(58) Field of Classification Search ............ 701/22, 701/123, 207, 209, 213, 25; 180/65.4, 65.8; 340/239; 903/921
See application file for complete search history.

(56) References Cited

U.S. PATENT DOCUMENTS

| 5,892,346 | A | * | 4/1999 | Moroto et al. .............. 318/587 |
|---|---|---|---|---|
| 5,995,895 | A | | 11/1999 | Watt et al. |
| 6,314,347 | B1 | | 11/2001 | Kuroda et al. |
| 6,381,522 | B1 | | 4/2002 | Watanabe et al. |
| 6,452,286 | B1 | | 9/2002 | Kubo et al. |
| 6,487,477 | B1 | * | 11/2002 | Woestman et al. ............ 701/22 |
| 6,856,866 | B2 | | 2/2005 | Nakao |
| 2002/0188387 | A1 | * | 12/2002 | Woestman et al. ............ 701/22 |
| 2005/0228553 | A1 | | 10/2005 | Tryon |

FOREIGN PATENT DOCUMENTS

| FR | 2811271 | 1/2002 |
|---|---|---|
| JP | 2004248455 | 9/2004 |
| JP | 2005160269 | 6/2005 |

\* cited by examiner

*Primary Examiner*—Mark Hellner

(57) ABSTRACT

A method is provided for controlling a hybrid vehicle powertrain, including recording a starting and ending point of a desired route, determining an optimally fuel efficient route, and executing a powertrain control strategy based on the route. Real-time traffic data and topographical data are continuously evaluated, and the route and powertrain control strategy are updated based on the data. A hybrid vehicle is also provided having an engine, a motor/generator, a battery, and a navigation system for receiving a route starting point and ending point. A powertrain control module (PCM) detects the battery charge and determines a powertrain strategy along an optimally fuel efficient route based on the detected charge level when the points are selected, and sustains the charge level in the absence of user-selected route points. Sensors receive real-time traffic data, and the navigation system includes topographical data for determining the optimally fuel efficient route.

5 Claims, 2 Drawing Sheets

HYBRID VEHICLE POWERTRAIN CONTROL METHOD AND APPARATUS

CROSS-REFERENCE TO RELATED APPLICATIONS

This application claims the benefit of U.S. Provisional Patent Application No. 60/779,602 filed on Mar. 6, 2006.

TECHNICAL FIELD

The present invention pertains generally to a hybrid vehicle having a control method for improving fuel efficiency of the vehicle, and more particularly to a method and apparatus for determining an optimal energy management strategy for maximizing the fuel economy of a hybrid vehicle operating in a charge-depleting mode.

BACKGROUND OF THE INVENTION

Conventional hybrid vehicles are powered by an engine and one or more electric motor/generators, which in turn may be powered or energized by a rechargeable battery. In a charge-depleting mode, the battery is slowly allowed to discharge or drop to a minimum or threshold charge level over the course of travel, and may be recharged, for example, by using available energy from the engine output, the motor/generator, and/or by plugging the battery into an available energy source, such as an electrical outlet, when the vehicle reaches its destination.

During hybrid vehicle operation, a control method typically selects a preferred power source or combination of power sources (i.e. the engine and/or one or more motor/generators) in order to power the hybrid vehicle in an optimally fuel efficient manner. The control method also monitors battery charge level and schedules battery recharging in order to ensure the motor/generators remain operational to drive the hybrid vehicle. The battery is maintained in a charge-deleting or charge-sustaining mode. In general, a battery enters a charge-depleting mode when a control method selects the motor/generator as the preferred power source, such as while the vehicle is accelerating from a standstill, and draws energy from the battery, thereby depleting the battery charge. In a charge-sustaining mode, the battery is maintained at a particular charge level, preserving or sustaining the battery charge level.

The efficiency of a given control method or algorithm in managing the selection and/or combination of available hybrid power sources is affected by various external factors. For example, the distance of a vehicle trip or route, route topography, and the frequency of braking over the course of the route, each influence the vehicle speed profile over that route. The ability to "look ahead" at a planned route in determining an optimal powertrain strategy may therefore help maximize fuel economy of the hybrid vehicle over the route.

SUMMARY OF THE INVENTION

Accordingly, a method is provided for controlling a hybrid vehicle powertrain having an internal combustion engine and a motor/generator. The method includes recording at least one set of route input data, including starting and ending points of a desired route, determining an optimally fuel efficient route for the vehicle, selecting a powertrain control strategy based on the optimal route profile, and executing the strategy.

In one aspect of the invention, the method includes receiving real-time traffic data as an additional set of route input data.

In another aspect of the invention, the method includes receiving topographical information describing the topography of the optimally fuel efficient route as another set of route input data.

In another aspect of the invention, the method includes continuously evaluating the real-time traffic data and updating the route and powertrain control strategy based on the continuously evaluated real-time traffic data.

In another aspect of the invention, the method includes setting a threshold battery charge level, determining the current charge level, and determining the powertrain control strategy based on the difference between the threshold and the current state of charge.

In another aspect of the invention, the powertrain control strategy includes powering the vehicle using the engine, and includes one of homogeneous charge compression ignition, port fuel injection, active fuel management, direct injection strategy, and variable compression ratio strategy within the engine.

In another aspect of the invention, the powertrain control strategy includes using at least one of ethanol, gasoline, dimethyl ether, and diesel fuel to run the internal combustion engine.

In another aspect of the invention, a method is provided for optimizing the fuel economy of a vehicle having a hybrid powertrain including an engine, battery, and at least one motor/generator. The method includes determining the presence or absence of a preferred route for the vehicle, including the starting point and the ending point of the preferred route, and selecting one of a charge-depleting or charge-sustaining powertrain control strategy. The charge-depleting strategy is selected when a preferred route is determined, and the charge-sustaining strategy is selected when a preferred route is not determined.

In another aspect of the invention, a hybrid vehicle is provided including an engine, a motor/generator, a battery operatively connected to the engine and motor/generator and rechargeable thereby, a navigation system operable for determining an optimally fuel efficient route based in part on a user-selected route starting point and ending point, and a powertrain control module (PCM) operatively connected to the navigation system. The PCM detects the battery charge level and determines an optimal powertrain strategy along the optimally fuel efficient route based on the charge level when user-selected points are selected, and sustains the detected charge level in the absence of user-selected starting and ending points.

In another aspect of the invention, a plurality of vehicle sensors receive real-time traffic data from an external source, and the PCM received the real-time traffic data and determines the optimal route based on the received real-time traffic data and user-selected points.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
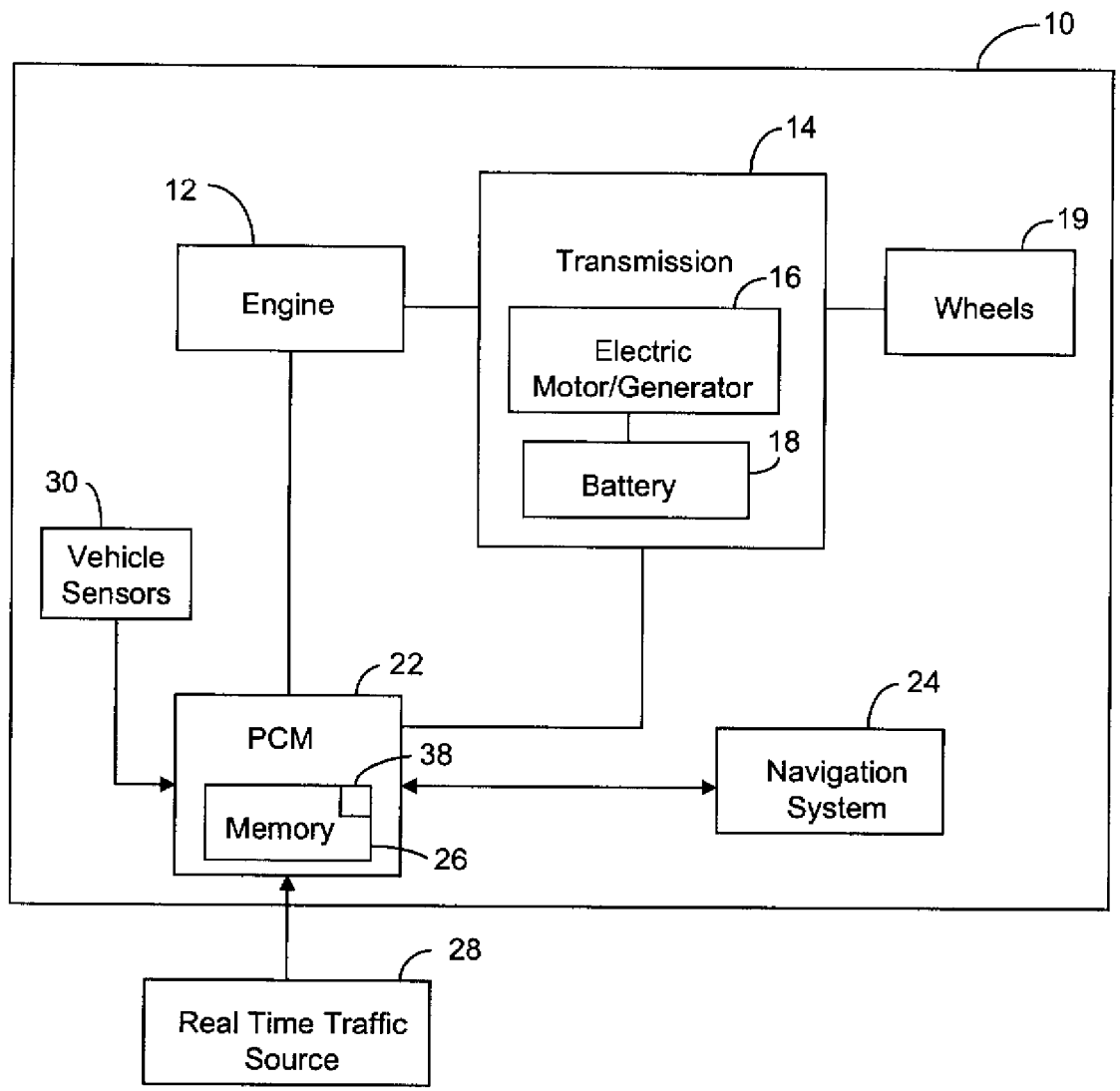
FIG. 1 is a schematic illustration of a hybrid vehicle in accordance with the present invention.

Referring to the drawings, wherein like reference numbers refer to like components, there is shown in FIG. 1 a schematic illustration of a hybrid vehicle 10 in accordance with the present invention. Hybrid vehicle 10 is shown for illustrative purposes, and alternate hybrid vehicle configurations may be envisioned within the scope of the invention. The hybrid vehicle 10 includes an engine 12 operatively connected to a transmission 14. The transmission 14 includes at least one electric motor/generator 16 that is powered by a rechargeable battery 18 when acting as a motor, and that is operable for recharging the battery 18 when operating as a generator. Transmission output or torque is transferred to the wheels 19 to thereby propel or drive the hybrid vehicle 10. A powertrain control module, or PCM, 22 is operatively connected to the engine 12 and transmission 14.

As the hybrid vehicle 10 is driven or operated, PCM 22 develops an optimal powertrain control strategy to power the hybrid vehicle 10 in an optimally fuel efficient manner. The powertrain control strategy may include, for example, a determination of when to run the engine 12 and the electric motor/generator 16, and/or when to charge the battery 18. As will be described in detail hereinafter, the PCM 22 includes a control method or algorithm 38 (see FIG. 2), as described hereinbelow, which is configured or programmed to "look ahead" and generate the powertrain control strategy and an optimal route for a particular trip. For purposes of the present invention, "look ahead" refers to the ability to anticipate future driving conditions or events.

In order to "look ahead", the PCM 22 is operatively connected to a vehicle navigation system 24. To initiate the method of the present invention, the operator manually inputs route input data for a preferred route into the navigation system 24 in the form of the starting and ending points of the route. The navigation system 24 can obtain the current location of the vehicle 10 using a global positioning system, or GPS, (not shown), or the current location can alternatively be manually input by the operator. Therefore, data identifying the starting point and ending point of a preferred route or trip is provided to the PCM 22.

The PCM 22 includes a memory device 26. An electronic map, such as those commercially available from TeleAtlas located in Southfield, Mich., is preferably stored in the memory device 26. Using the electronic map along with the starting point and ending point of a particular route or trip, the PCM 22 can select an optimal route. The determination of which route is optimal is preferably based primarily on vehicle fuel economy, however, other considerations may include, for example, the estimated time for the trip, the distance required for the trip, and/or traffic controls. The electronic map preferably includes elevation or topography information which may also be used in the selection of an optimal route. As an example, a shorter route having extreme elevation changes, such as hilly or mountainous topography, may require more fuel consumption than a longer route with generally constant or flat elevation.

The PCM 22 receives "look ahead" data in the form of real-time traffic information from one or more of a plurality of external sources 28. The real time traffic sources 28 may include, for example, an OnStar® system, a satellite radio device, a vehicle-to-vehicle communication device, and/or a cellular phone connection. This real-time traffic data may be used by the PCM 22 in determining the optimal route. As an example, a shorter route having excessive traffic congestion may require the vehicle to accelerate and decelerate more frequently and thereby increase fuel consumption as compared to a longer route with less traffic, such that the longer route would be the optimal route.

The PCM 22 receives vehicle data from one or more of a plurality of vehicle sensors 30. The vehicle sensors 30 are configured or programmed to receive and/or monitor a variety of vehicle characteristics such as, for example, fuel level, remaining battery charge or current charge level, temperature, and/or speed, or other similar vehicle characteristics. This received or monitored sensor data is used to determine the powertrain control strategy. As an example, if the battery charge level is low, i.e. is less than or equal to a predetermined or threshold battery charge level, it may be necessary to operate the engine 12 in order to power the vehicle 10 and charge the battery 18 such that adequate vehicle performance is maintained.

Figure 2:
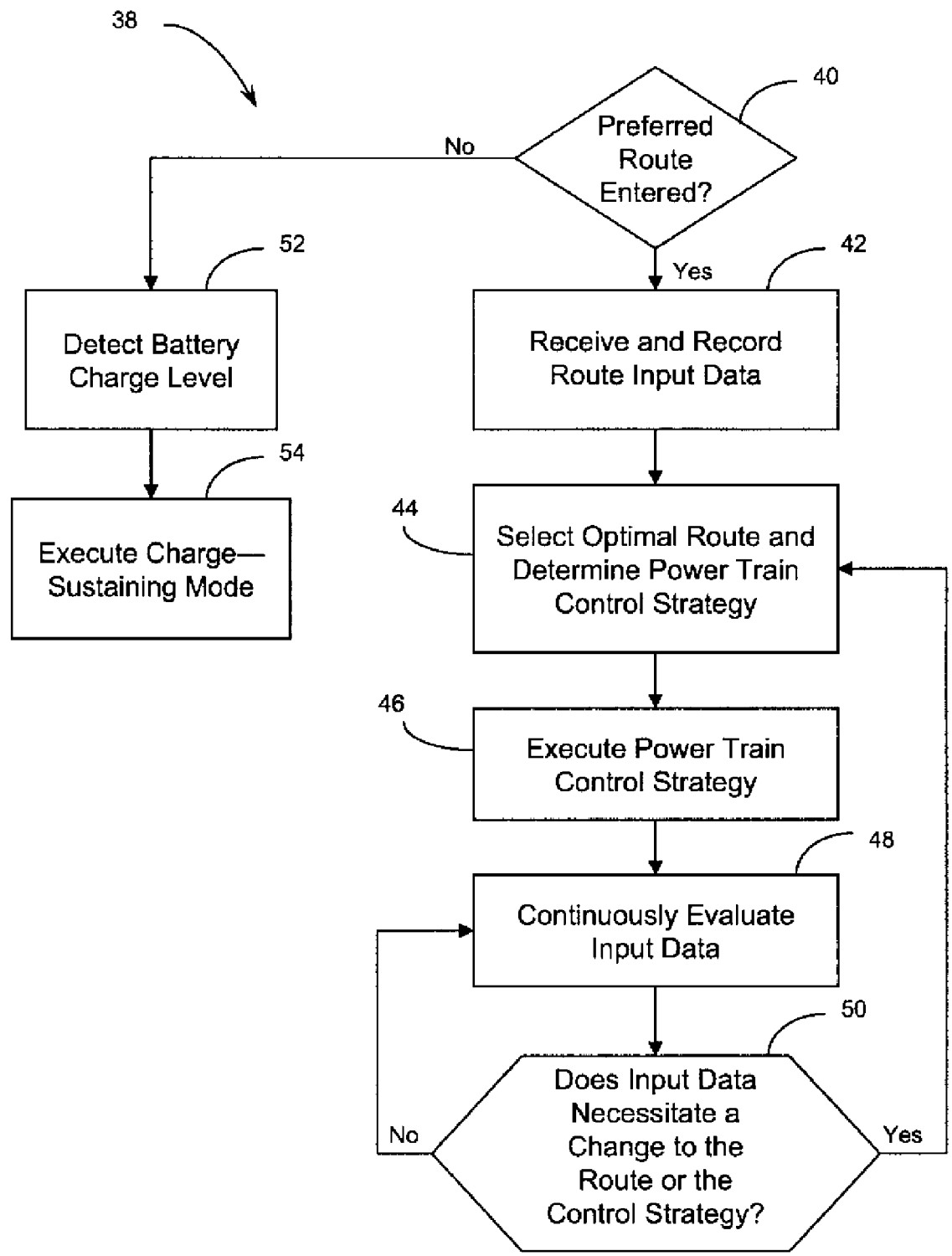
FIG. 2 is a flow chart illustrating the preferred method of the present invention.

Having described the apparatus of the present invention hereinabove, the preferred method will now be explained. FIG. 2 depicts a method or algorithm 38 of the present invention. More precisely, FIG. 2 shows a block diagram representing steps performed by the PCM 22 (shown in FIG. 1).

Beginning with step 40, the algorithm 38 determines whether a preferred route is selected or entered, such as by determining whether user-selected starting and ending points describing a preferred route have been entered into the navigation system 24 (see FIG. 1). As indicated hereinabove, the starting point data may be obtained from a GPS system (not shown) or may be manually input into the navigation system 24 (see FIG. 1) by the vehicle operator. The data identifying the ending point of the trip is preferably manually input by the vehicle operator. If starting point and ending point data are not input at step 40, the algorithm 38 defaults to step 52 and implements a more conventional "charge sustaining strategy" or mode, as will be defined in more detail hereinafter. Otherwise, the algorithm 38 proceeds to step 42.

At step 42, the route data is received by the PCM 22 (see FIG. 1) and recorded in memory 26. The algorithm 38 then proceeds to step 44.

At step 44, the algorithm 38 selects an optimal route and develops a powertrain control strategy. There may be a correlation between these two objectives, such that the selection of an optimal route may impact the powertrain control strategy and vice versa. The optimal route and powertrain control strategy are therefore preferably selected together based on received or monitored "look ahead" data as previously described hereinabove, for example from the real-time traffic sources 28, vehicle data from the vehicle sensors 30, and/or map or topographical information stored or recorded in memory device 26 (see FIG. 1). The selected or determined optimal route is preferably conveyed to the vehicle operator via the navigation system 24 (see FIG. 1).

According to the preferred embodiment, the powertrain control strategy of step 44 operates the hybrid vehicle 10 (shown in FIG. 1) in a "charge-depleting mode". For purposes of the present invention, a "charge-depleting mode" is a mode wherein the vehicle 10 is powered primarily by the electric motor/generator 16 such that the battery 18 is depleted or nearly depleted when the vehicle 10 reaches its destination. In other words, during the charge-depleting mode, the engine 12 is only operated to the extent necessary to ensure that the battery 18 is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle 10 can conserve some or all of the fuel that would otherwise be expended to maintain the 25% battery charge level in a conventional hybrid vehicle. It should be appreciated that the vehicle 10 is preferably only operated in the charge-depleting mode if the battery 18 can be recharged after the destination is reached by plugging it into an energy source (not shown).

According to an alternate embodiment, the powertrain control strategy of step 44 operates the engine 12 (see FIG. 1) using homogeneous charge compression ignition, or HCCI. As is known by those skilled in the art, HCCI is an efficient operational mode wherein an internal combustion engine generates pressure to automatically ignite the combustion gasses (i.e., without a spark). Additional engine 12 operational modes configured to improve efficiency and fuel economy may also be envisioned. For example, alternate engine 12 operational modes may include current baseline combustion technology such as port fuel injection, as well as other advanced combustion strategies such as variable valve actuation (VVA), active fuel management (also known as displacement on demand or cylinder deactivation), direct injection, or variable compression ratio.

According to another alternate embodiment, the powertrain control strategy of step 44 operates the engine 12 using various types of fuel to improve the efficiency and fuel economy of a particular application. Such fuels may include, for example, gasoline or diesel, or may include alternative fuels such as ethanol or dimethyl ether. Once an optimal route is selected and a powertrain control strategy is determined in step 44, the algorithm 38 proceeds to step 46.

At step 46, algorithm 38 executes the powertrain control strategy developed in step 44. More precisely, the PCM 22 (see FIG. 1) controls the engine 12 and the transmission 14, including the electric motor/generator 16 and the battery 18, to power the vehicle 10 in the manner dictated by the powertrain control strategy. The algorithm 38 then proceeds to step 48.

At step 48, the algorithm 38 continuously evaluates route input data including "look ahead" data from the real-time traffic sources 28 (see FIG. 1), and vehicle data from the vehicle sensors 30. This step is implemented to account for new information that was not initially available when the optimal route was selected and the powertrain control strategy was developed. As an example, if the vehicle is traveling along a previously selected optimal route and the PCM 22 receives real-time traffic information indicating that the currently selected route is becoming congested due to a traffic accident, it may be necessary to select an alternate route. The algorithm then proceeds to step 50.

At step 50, the algorithm 38 determines whether the input data of step 48 necessitates a change to the route or the control strategy. If, at step 50, the input data of step 48 does not necessitate a change to the route or the control strategy, the algorithm 38 continues in a loop with step 48 and continuously evaluates the input data. If, at step 50, the evaluated input data of step 48 necessitates a change to the route or the control strategy, the algorithm 38 returns to step 44.

At step 52 (see step 40) the algorithm 38 defaults to a "charge-sustaining mode", as previously described hereinabove. In step 52, the PCM 22 detects or measures the current or present charge level of the battery 18, and compares this current charge level to a stored threshold or minimum battery charge. The algorithm 38 then proceeds to step 54, wherein the PCM 22 executes the default charge-sustaining mode, thereby sustaining the charge level of battery 18 at or above the threshold battery charge level.

While the best modes for carrying out the invention have been described in detail, those familiar with the art to which this invention relates will recognize various alternative designs and embodiments for practicing the invention within the scope of the appended claims.

The invention claimed is:

1. A hybrid vehicle comprising:
   an engine;
   a motor/generator;
   a battery operatively connected to the engine and motor/generator and rechargeable using at least of said engine and said motor/generator;
   a navigation system operable for receiving a user-selected route starting point and ending point defining a preferred route; and
   a powertrain control module (PCM) operatively connected to said navigation system, said PCM being operable for selecting an optimally fuel efficient route for reaching said ending point using at least one set of route input data;
   wherein said PCM is operable for detecting a charge level of said battery and determining a charge-depleting powertrain strategy along said optimally fuel efficient route based in part on said detected charge level when said route starting and ending points are selected, and is further operable for sustaining said detected charge level of said battery above a predetermined level in the absence of said route starting and ending points;
   said charge-depleting powertrain strategy defining a mode wherein the hybrid vehicle is powered primarily by said motor/generator such that said battery is depleted when the hybrid vehicle reaches said ending point.

2. The hybrid vehicle of claim 1, including a plurality of vehicle sensors operable for receiving real-time traffic data from an external source relative to the vehicle, wherein said PCM is configured to receive said real-time traffic data and determine said optimally fuel efficient route based in part on said received real-time traffic data and said starting and ending points.

3. The hybrid vehicle of claim 1, wherein said navigation system includes topographical data for said route, and said PCM determines said route based in part on said topographical data.

4. The hybrid vehicle of claim 1, wherein said powertrain strategy includes powering the vehicle with said engine, and includes one of homogenous charge compression ignition, port fuel injection, active fuel management, direct injection strategy, and variable ratio strategy with said engine.

5. The hybrid vehicle of claim 1, wherein said powertrain strategy includes using at least one of ethanol, gasoline, dimethyl ether, and diesel fuel to run said engine.

* * * * *